Nov. 6, 1928.
C. H. POTTS
1,690,501
HEAT EXCHANGER
Filed Jan. 11, 1928     2 Sheets-Sheet 1
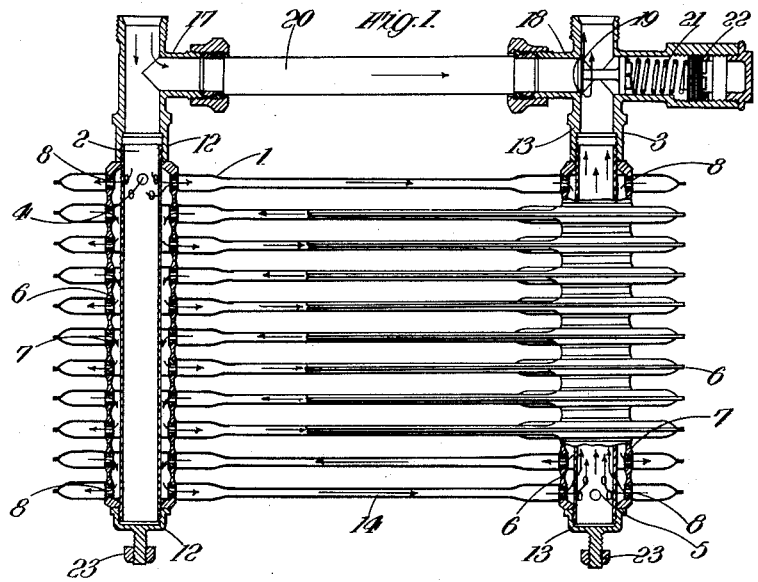
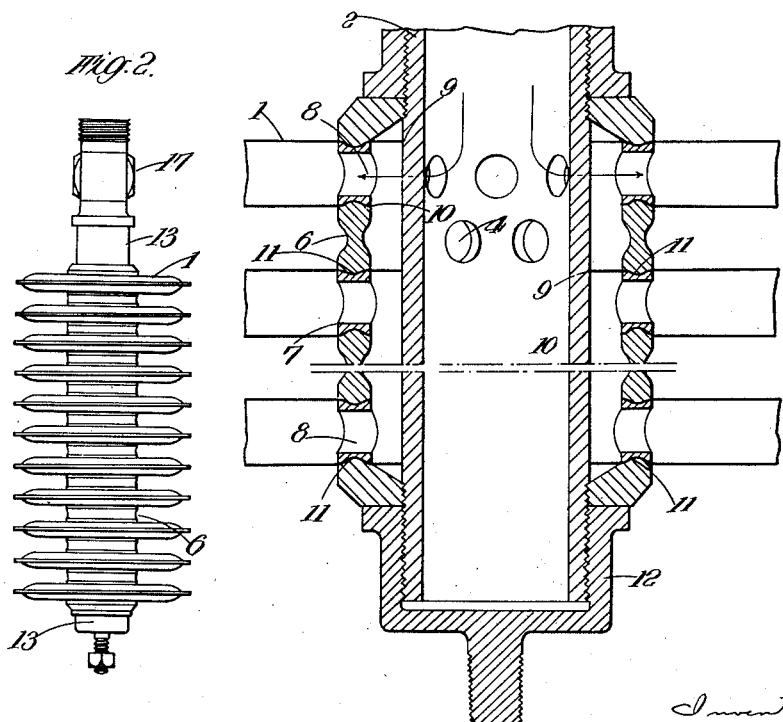

Nov. 6, 1928.
C. H. POTTS
1,690,501
HEAT EXCHANGER
Filed Jan. 11, 1928      2 Sheets-Sheet 2
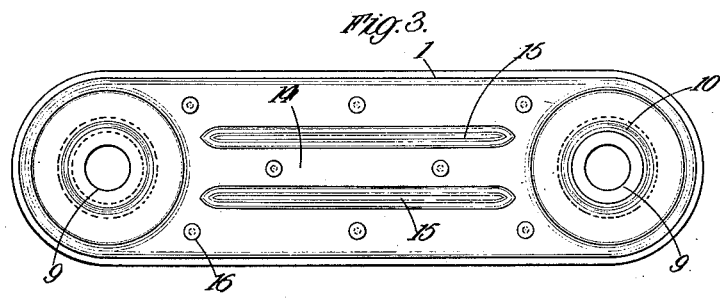
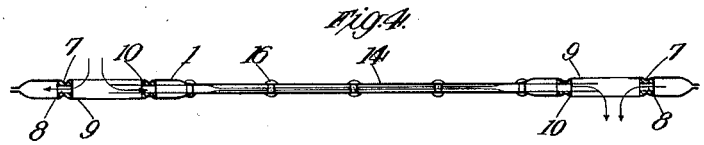
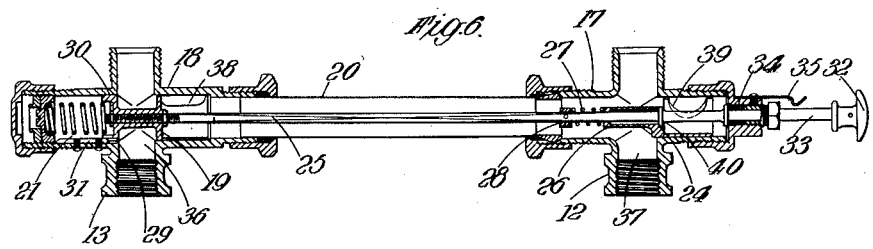

Patented Nov. 6, 1928.

1,690,501

UNITED STATES PATENT OFFICE.

CHARLES HAROLD POTTS, OF WESTMINSTER, LONDON, ENGLAND, ASSIGNOR TO VICKERS LIMITED, OF WESTMINSTER, ENGLAND, A BRITISH COMPANY.

HEAT EXCHANGER.

Application filed January 11, 1928, Serial No. 245,915, and in Great Britain October 8, 1926.

This invention relates to heat exchangers and more particularly to radiators or coolers for oil or other liquids, the said heat exchangers being of the type comprising a tier of communicating hollow cooling elements and means for clamping them in position with spacing rings between the adjacent elements.

According to the invention a radiator or cooler comprises a tier of hollow shallow thin metal elements with preferably rounded or semi-circular ends and having inlet holes at one end and outlet holes at the other end, an inner ring having radial holes inside each element at each end, an outer solid ring between each end of adjacent elements, an inlet, an outlet, complementary annular projections and recesses of curved cross section at the adjacent faces of adjacent rings which engage one wall of an element between them so as to form a metal-to-metal joint, and means for locating and clamping the parts in position, the arrangement being such that the fluid being treated flows through the elements in series.

The means for locating and clamping the parts in position may comprise an inlet tube passing through the elements and the rings at one end, an outlet tube passing through the elements and the rings at the other end, and fittings screwed on the inlet and outlet tubes. The inlet tube has radial holes communicating with the radial holes in the inner ring at one end of the first element, the outlet tube has radial holes communicating with the radial holes in the inner ring at the opposite end of the last element, and each other inner ring has its lateral holes communicating with the lateral holes in one adjacent inner ring. The arrangement is such that the passage way through the radiator or cooler extends to-and-fro, along one element in one direction and along the following element in the opposite direction. Each communication between the radial holes in adjacent inner rings is formed by an annular space between the rings, both inner and outer and the inlet or outlet tube respectively, and is restricted to connecting the interiors of one pair of elements by stops in the annular spaces. The stops may be formed by one hole in one wall of each element fitting the inlet tube, and by one hole in the other wall of each element fitting the outlet tube, the other holes in the walls of each element being larger than the inlet and the outlet tubes respectively. It will be obvious that instead of employing inlet and outlet tubes extending through the elements and the rings having screwed on fittings, other means may be used for locating and clamping the elements in position.

The elements preferably are pressed in or shaped between their ends to reduce their depth and to obtain a better cooling effect, particularly when the cooler is to be employed as an oil cooler.

A bye-pass tube may be employed between the inlet tube and the outlet tube, with an adjustably loaded automatic valve which, in the event of the pressure in the radiator or cooler rising above a predetermined limit, allows the liquid to be short-circuited across the radiator or cooler.

A cut-out arrangement may be employed for controlling the cooler by hand as required.

The invention is illustrated diagrammatically and by way of example in the accompanying drawings, in which:—

Figure 1 is in part a front elevation and in part a vertical section of an oil or the like cooler;

Figure 2 is an end elevation of Figure 1;

Figure 3 is a plan of one of the hollow shallow thin metal elements.

Figure 4 is a longitudinal section of Figure 3;

Figure 5 is an enlarged vertical section of a fragment of the cooler; and

Figure 6 is a longitudinal section of a detail modification.

Referring particularly to the construction shown in Figures 1 to 5, a number of hollow cooling elements 1 of oblong form with semi-circular ends are secured and positioned by two connecting tubes 2, 3, which are used for the main supply and return respectively of the oil and have a number of radial holes 4, 5 for the oil to flow through. The elements are also positioned by means of external rings 6 which form all-metal joints and oil seals between adjacent elements.

Inside each element are two rings 7, one at each end, placed concentrically with the tubes 2, 3. These internal rings 7 co-operate with the external rings 6, and all the rings are made of a larger internal diameter than the external diameter of the tubes 2, 3. The internal rings 7 are formed with radial holes 8 for the oil to flow through into and from the elements.

Each element is built up of thin sheet metal in two halves, each half element having a hole at each end. The hole 9 at one end of each half element is made to fit one of the tubes 2, 3, and the hole 10 at the other end is made the same size as the inside diameter of the internal rings 7, 7. The half elements are fitted together by securing the outer edges thereof by suitable means, with one large hole 10 and one small hole 9 at each end. This arrangement is resorted to in order to obtain a to-and-fro direction of the oil flow through the elements in series, as indicated by the arrows in Figure 1.

The elements are oil sealed by the all-metal joints formed by the rings 6, 7, inside and outside the elements. Each internal ring 7 has concave sides and each external ring has convex sides as shown at 11. The concave and convex surfaces are suitably made to form an effective joint when the side of an element is placed between them, the element being complementarily formed at this part, or being pressed into the complementary formation by the operation of clamping the parts in position. The joints are maintained fluid tight by means of fittings 12, 13, which are screwed on the ends of the connecting tubes 2, 3.

Each element at each end has a depth or thickness which is determined by the internal rings 7. The centre part 14 or the part between the ends of each element is pressed in or shaped to reduce the depth. With this arrangement the oil passage causes the whole of the oil in circulation to pass in contact with or near the surface of the cooler or the cooling surfaces, and the air space between the elements is increased without increasing the depth of the complete cooler. Ribs 15 may be formed along the centre parts of the elements for strengthening purposes or otherwise, and spacing or connecting rivets 16 may be employed.

A hollow T-fitting 17 may be fitted on the inlet tube 2 with provision for fitting a pressure gauge, and the outlet tube 3 may be fitted with a hollow cross-fitting 18 containing a relief valve 19. The two hollow fittings may be connected by a pipe 20 which is used as a bye-pass. The relief valve 19 when used prevents any excessive pressure in the elements and is set according to the known liquid pressure at normal revolutions per minute of the engine at atmospheric temperature (15° C.). The said relief valve may consist of an ordinary poppet valve, which is held on its seating by a spring 21, the desired pressure being obtained by means of an adjustable plug 22 bearing against the outer end of the spiral spring.

The form of element and metal joint described enable the radiator to be made of any required size by varying the length of the two connecting tubes 2, 3 or other clamping means.

The hollow fittings, and the caps 12 and 13 which seal the ends of the connecting tubes 2, 3 may form points on which attachments 23 can be fitted for mounting the oil cooler in position.

In the operation of the oil cooler the oil is passed in at the inlet pipe 2, flows from the inlet tube through the radial holes 4 therein and through the radial holes 8 in the first inner ring into the first or top element 1, through this element and out at the other end thereof into the second element, and so on throughout the series of elements. The oil can only take this path as one side of each element is made to fit the connecting tube and the other side is made to correspond to the inside diameter of the internal rings, which is larger than the external diameter of the connecting tubes, as aforesaid. When the oil has passed through all the elements to the last or bottom element it returns through the radial holes 8 in the last inner ring and through the radial holes 5 into and through the outlet tube. If the pressure exceeds that required, the oil flows through the bye-pass pipe 20 and returns through the relief valve 19 without passing through the cooler.

Referring now particularly to Figure 6, in which an arrangement is shown for enabling the cooler to be short circuited automatically and to be cut out of action by hand, as required.

In this arrangement, the hollow inlet fitting 17 and the hollow outlet fitting 18 are fitted with piston valves 24, 19, which are independently movable. The piston valve 19 serves as a relief valve, and is loaded by a spring 21 and fitted with a spindle 25 of square section, which extends through the bye-pass pipe 20 into a hollow stem 26 of the piston valve 24, which serves as a hand operated cut-out and bye-pass valve as required. The cut-out valve 24 is located in the hollow inlet T-piece 17 and is kept in its normal or open position, as shown, by means of a light spring 27, which bears against a stop 28 on the spindle, and the said valve 24 is prevented from turning by its stem 26 fitting on the square spindle 25. The spindle 25 is prevented from turning in the bye-pass pipe 20 by means of a key-way 29 on a perforated head 30 fast on the spindle and engaging a key or feather 31 in the hollow outlet fitting 18. The cut-out valve 24 can be moved by hand by means of a handle 32 fixed on a rod or plunger 33 which passes through a gland 34 and at its inner end 40 abuts loosely against the hollow stem 26 of the cut-out valve 24 and against the end of the square spindle 25 the said plunger and square spindle being separate from each other. The rod or plunger 33 is kept in its normal position, as shown, by the springs 21, 27, but when forced inwards by hand the rod or plunger 33 is kept in its innermost position by a spring detent 35 on the T-piece engaging the handle 32.

When the valve arrangement shown in Figure 6 is applied to a tier of elements as shown in Figure 1, the inlet tube 2 becomes the outlet tube, the outlet tube 3 becomes the inlet tube and the oil flows firstly into the bottom element through the holes 5 and lastly into the top element, and therefrom through the holes 4.

The operation of the relief and cut-out valves is as follows:—

Under normal operation, the oil flowing into the inlet, when exceeding a predetermined pressure, opens the relief valve 19 and returns to the oil system, short circuiting the cooler, but is free to enter the inlet pipe 3 from the hollow inlet fitting 17 owing to the relief valve 19 moving independently of the cut-out valve 24. When it is desired to cut the cooler out of the oil circuit by hand, the plunger 33 is pushed in, and in so doing moves both the relief valve 19 and the cut-out valve 24 into position over the respective ports 36, 37, in the outlet and inlet pipes 2, 3, thereby stopping any oil from flowing through the cooler. The oil is then free to pass through cut away portions 38, 39 in the relief valve 19 and the cut-out valve 24 and through the bye-pass pipe 20.

What I claim and desire to secure by Letters Patent of the United States is:—

1. A heat exchanger comprising a tier of hollow, shallow, thin metal elements having inlet holes at one end and outlet holes at the other end, an inner ring having radial holes inside each element at each end, an outer ring between the elements of each adjacent pair at each end, complementary annular projections and recesses at the adjacent faces of adjacent rings and engaging one wall of an element between them and means for locating and clamping the parts in position and for providing a succession of annular spaces for enabling the fluid in the exchanger to pass through the elements in series.

2. A heat exchanger comprising a tier of hollow, shallow, thin metal elements having inlet holes at one end and outlet holes at the other end, an inner ring having radial holes inside each element at each end, an outer ring between the elements of each adjacent pair at each end, inlet and outlet conduits extending through the holes at the opposite ends of said elements, and means whereby a succession of annular spaces are provided around said conduits for enabling the fluid in the exchanger to pass through the elements in series.

3. A heat exchanger comprising a tier of hollow, shallow, thin metal elements having inlet holes at one end and outlet holes at the other end, an inner ring having radial holes inside each element at each end, an outer ring between the elements of each adjacent pair at each end, complementary annular projections and recesses at the adjacent faces of adjacent rings and engaging one wall of an element between them, an inlet tube passing through the elements and the rings at one end, an outlet tube passing through the elements and the rings at the other end, and fittings detachably secured to the ends of the inlet and outlet tubes for clamping the parts in position, one hole in one wall of each element fitting the inlet tube, one hole in the other wall of each element fitting the outlet tube and the other holes in the walls of each element being larger than the outlet and inlet tubes respectively.

4. A heat exchanger comprising a tier of hollow, shallow, thin metal elements having inlet holes at one end and outlet holes at the other end, an inner ring having radial holes inside each element at each end, an outer ring between the elements of each adjacent pair at each end, complementary annular projections and recesses at the adjacent faces of adjacent rings and engaging one wall of an element between them, an inlet tube passing through the elements and the rings at one end and having openings in the wall of said tube near its inlet end, an outlet tube passing through the elements and the rings at the other end and having openings in the wall of said tube remote from its outlet end, and fittings detachably secured to the ends of the inlet and outlet tubes for clamping the parts in position, one hole in one wall of each element fitting the inlet tube, one hole in the other wall of each element fitting the outlet tube and the other holes in the walls of each element being larger than the outlet and inlet tubes respectively to provide a succession of annular spaces for the fluid to pass through the elements in series.

5. A heat exchanger comprising a tier of hollow, shallow, thin metal elements having inlet holes at one end and outlet holes at the other end, inlet and outlet tubes extending through the holes at the opposite ends of said elements, means whereby a succession of annular spaces are provided around said inlet and outlet tubes, a bye-pass extending between the inlet and outlet tubes near their inlet and outlet ends and an automatic relief valve for controlling said bye-pass.

6. A heat exchanger comprising a tier of hollow, shallow, thin metal elements having inlet holes at one end and outlet holes at the other end, inlet and outlet tubes extending through the holes at the opposite ends of the elements, means whereby a succession of annular spaces are provided around said inlet and outlet tubes, a bye-pass extending between the inlet and outlet tubes near their inlet and outlet ends, and a cut-out valve in said bye-pass.

7. A heat exchanger comprising a tier of hollow, shallow, thin metal elements having inlet holes at one end and outlet holes at the other end, inlet and outlet tubes extending through the holes at the opposite ends of the elements, means whereby a succession of annular spaces are provided around said inlet and outlet tubes, a bye-pass extending between the inlet and outlet tubes near their inlet and outlet ends, a relief valve in said bye-pass, means for enabling said valve to be operated either automatically or by hand, a cut-out valve in said bye-pass and means for operating said cut-out valve by hand.

8. A heat exchanger comprising a tier of hollow, shallow, thin metal elements having inlet holes at one end and outlet holes at the other end, spacing members between adjacent elements at each end of said elements, locating members of less cross-sectional area than the holes extending through the holes at the opposite ends of said elements whereby a succession of annular spaces are provided around said locating members for enabling fluid in the exchanger to pass through the elements in series.

9. A heat exchanger comprising a tier of hollow, shallow, thin metal elements having inlet holes at one end and outlet holes at the other end, spacing members between adjacent elements at each end of said elements, locating members of less cross sectional area than the holes extending through the holes at the opposite ends of said elements whereby a succession of annular spaces are provided around said locating members for enabling fluid in the exchanger to pass through the elements in series, an inlet pipe communicating with one of the annular spaces, an outlet pipe communicating with another of the annular spaces, a bye-pass between the inlet and the outlet pipes and an automatic relief valve in said bye-pass.

10. A heat exchanger comprising a tier of hollow, shallow, thin metal elements having inlet holes at one end and outlet holes at the other end, an inner ring having radial holes inside each element at each end, an outer ring between adjacent elements at each end of said elements, and means passing through the ends of the elements for locating and clamping the parts in position, one hole in one wall of each element fitting the means at one end, one hole in the other wall of each element fitting the means at the other end, and the other holes in the walls of each element being larger than such means.

11. A heat exchanger comprising a tier of hollow, shallow, thin metal elements each of which is provided with two holes of different diameters at each end, an inner ring having radial holes inside each element at each end, an outer ring between adjacent elements at each end of said elements, a locating member passing through the holes at the opposite ends of the elements, one hole in one wall of each element fitting one of the locating members, one hole in the other wall of each element fitting the other locating member and the other holes in the walls of each element being larger than the locating members to provide a succession of annular spaces around the locating members for enabling the fluid in the exchanger to pass through the elements in series.

CHARLES HAROLD POTTS.